March 10, 1931.    B. A. ZEDLER    1,795,632
CARPET AND METHOD OF PRODUCING THE SAME
Filed Sept. 15, 1927
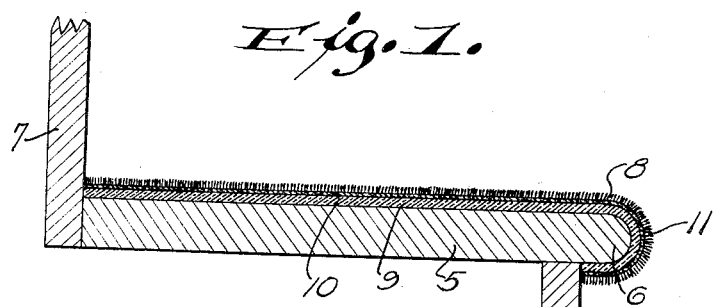
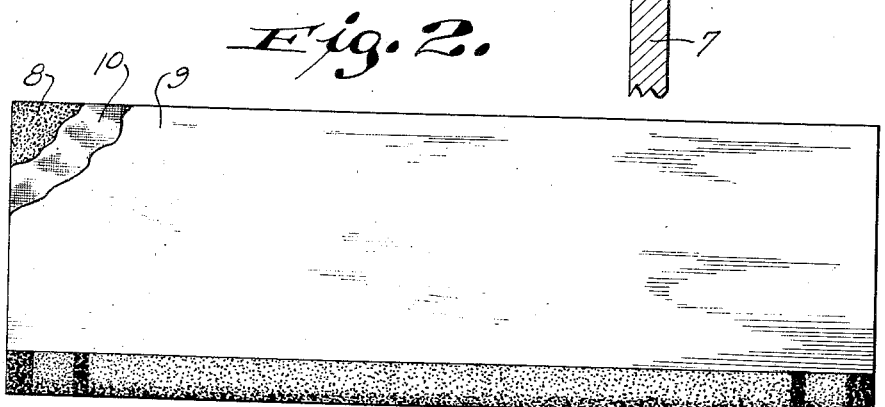
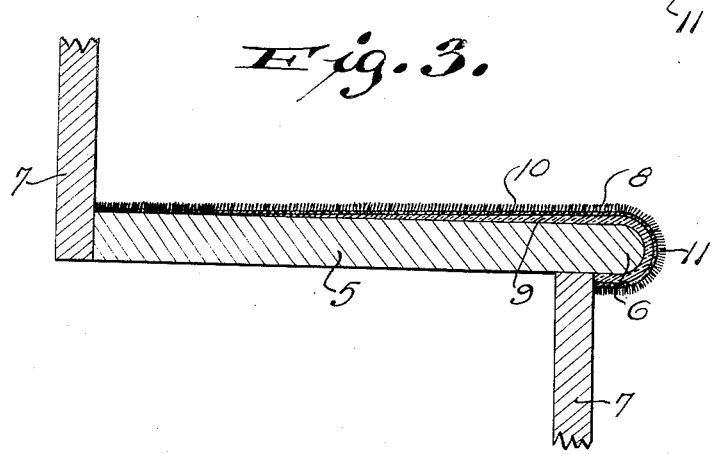
INVENTOR.
Benno A. Zedler.
BY
Morsell, Keeney & Morsell,
ATTORNEYS.

Patented Mar. 10, 1931

1,795,632

UNITED STATES PATENT OFFICE

BENNO A. ZEDLER, OF MILWAUKEE, WISCONSIN

CARPET AND METHOD OF PRODUCING THE SAME

Application filed September 15, 1927. Serial No. 219,772.

This invention relates to improvements in carpets used more particularly as stair coverings and to the method of producing the same.

It is one of the objects of this invention to provide a waterproof carpet comprising an upper layer of wool or other fabric and a lower layer of rubber, the two layers being inseparably joined by a rubber cement.

It is a further object of this invention to provide a stair cover which can be furnished in separate units, one for each step, so that when wear occurs on any part of the stair covering only one unit need be replaced.

It is a further object of this invention to provide a stair cover in which the outer edge is hook-shaped to conform to the shape of the nose of the stair tread.

It is a further object of this invention to provide a carpet which can be readily cleaned.

It is a further object of this invention to provide a carpet having a lining of yielding material of sufficient strength to maintain the carpet in a flat position, and to prevent it from being scuffed out of place by the feet.

It is a further object of this invention to provide a carpet which is simple to manufacture, is durable, and is well adapted for the purpose described.

With the above and other objects in view, the invention consists of the improved carpet and method of producing the same, and all its parts and combinations as set forth in the claims, and all equivalents thereof.

In the accompanying drawing, in which the same reference characters designate the same parts in all of the views:

Fig. 1 is a vertical sectional view of a portion of a staircase with the improved carpet in place on the tread of a step;

Fig. 2 is a bottom view of one of the units of the improved carpet, parts of each layer of the carpet being broken away; and Fig. 3 is a vertical sectional view of a portion of a staircase with a modified form of the carpet in place on the tread of a step.

Referring to the drawing, the numeral 5 designates the tread of a step, the numeral 6 the projecting nose of the tread, and the numeral 7 the riser. The improved carpet comprises an upper layer 8 of ordinary carpet material, such as wool, fibre, or cotton, and a lower layer 9 of rubber or of a mixture of rubber and shredded cotton. The two layers are held together by an intermediate layer of vulcanizing rubber cement 10.

The method employed in producing this carpet is as follows: An ordinary piece of carpet made of wool, fibre, cotton, or any other suitable material, is coated on its under side with vulcanizing rubber cement. When the cement has hardened, a strip of rubber, or of a mixture of rubber and shredded cotton, is placed under the layer of carpeting. The carpeting with its coating of cement and the rubber lining are then placed between two steam heated plates under pressure. This causes the vulcanizing rubber to melt and adhere to the rubber lining. The pressure is then removed and the product allowed to cool and harden. The result will be a union of the carpeting and the rubber lining.

To produce a stair tread covering, the rubber lined carpet is cut into strips of the desired dimensions, and the outer edge of each strip is bent over a hot pipe. This causes the rubber lining to soften and conform to the shape of the pipe, and when the product is removed from the hot pipe, there will be a permanent hook-shaped edge 11 to fit over the nose of the stair tread. The resulting product will be a stair tread carpet which will fit perfectly over the tread of a stair, which will lie flat and unwrinkled, and which will naturally bend around the nose of the step without necessitating the use of metallic frames, such as have heretofore been employed to hold stair carpets in place.

In the modified form shown in Fig. 3, the rubber lining is thick at the hook-shaped edge, and tapers off to a point near the riser of the step where there is nothing but plain carpeting. This permits the inner edge of the carpet to be bent under at an angle when the carpet is to be used on a winding stairway.

While I have particularly described the invention for use as a stair covering, yet I do not wish to be understood as limiting myself to that particular adaptation, as the broad concept of the invention contemplates the production of a carpet of the form hereinbefore described and for use as a floor covering generally.

From the foregoing description, it may be seen that the improved carpet and method of producing the same is simple, durable, and well adapted for the purpose described.

What I claim is:

1. A two ply stair tread covering, consisting of an outer ply length of carpet material of a size to fit a stair tread, and an inner ply length of yielding material affixed to the lower side of the carpet material to maintain the carpet strip in a yieldable and unwrinkled position, said inner ply being tapered inwardly to render the inner portion of the carpet more flexible than the outer portion.

2. A two ply stair tread, consisting of an outer ply length of carpet material of a size to fit a stair tread, and an inner ply length of rubber affixed to the lower side of the carpet material to maintain the carpet strip in a yieldable and unwrinkled position, the rubber at the outer edge of the stair tread being bent to maintain the carpet material in a hook-like position to fit over the nose of the stair tread, and said bent portion of the rubber backing acting to grip the nose of the stair tread to hold the carpet in position.

In testimony whereof, I affix my signature.

BENNO A. ZEDLER.